(12) United States Patent
Kwitek

(10) Patent No.: US 11,297,021 B2
(45) Date of Patent: Apr. 5, 2022

(54) PREDICTIVE PRIVACY SCREENING AND EDITING OF ONLINE CONTENT

(71) Applicant: Benjamin Kwitek, Canon City, CO (US)

(72) Inventor: Benjamin Kwitek, Canon City, CO (US)

(*) Notice: Subject to any disclaimer, the term of this patent is extended or adjusted under 35 U.S.C. 154(b) by 0 days.

(21) Appl. No.: 16/948,173

(22) Filed: Sep. 6, 2020

(65) Prior Publication Data

US 2021/0075755 A1    Mar. 11, 2021

Related U.S. Application Data

(60) Provisional application No. 62/896,136, filed on Sep. 5, 2019.

(51) Int. Cl.
| | |
|---|---|
| *H04L 51/00* | (2022.01) |
| *G06F 16/28* | (2019.01) |
| *G06N 20/00* | (2019.01) |
| *H04L 51/52* | (2022.01) |
| *G06F 16/9536* | (2019.01) |

(52) U.S. Cl.
CPC ............ *H04L 51/12* (2013.01); *G06F 16/285* (2019.01); *G06F 16/9536* (2019.01); *G06N 20/00* (2019.01); *H04L 51/32* (2013.01)

(58) Field of Classification Search
CPC ....... H04L 51/12; H04L 51/32; G06F 16/285; G06F 16/9536; G06N 20/00
USPC .......................................... 709/206
See application file for complete search history.

(56) References Cited

U.S. PATENT DOCUMENTS

| | | | | |
|---|---|---|---|---|
| 8,856,232 | B1* | 10/2014 | Swerdlow | G06Q 50/01 709/204 |
| 10,637,826 | B1* | 4/2020 | Luo | H04L 63/0245 |
| 10,956,522 | B1* | 3/2021 | Jha | G06F 16/355 |
| 2009/0234831 | A1* | 9/2009 | Ebadollahi | G06Q 30/0201 707/999.005 |
| 2013/0268357 | A1* | 10/2013 | Heath | G06Q 10/10 726/26 |
| 2014/0215495 | A1* | 7/2014 | Erich | G06F 11/3438 719/318 |
| 2016/0234147 | A1* | 8/2016 | Joel | H04W 4/60 |
| 2017/0032021 | A1* | 2/2017 | Watanachote | H04L 51/16 |
| 2017/0083508 | A1* | 3/2017 | Dixon | G06F 40/58 |

(Continued)

*Primary Examiner* — Tauqir Hussain
(74) *Attorney, Agent, or Firm* — Law Office of Scott C Harris, Inc

(57) ABSTRACT

A filtering system for received content, uses a computer, which receives content to be posted, the computer receiving content from a plurality of different users; the computer including a content filtering system, receiving the content from the plurality of different users, and operating to carry out a first autonomous screening of the content to use rules to determine whether the content meets a posting criteria, and categorizing the content as to whether the autonomous screening indicates that the content has met the posting criteria, the computer further receiving input from a human screening process which carries out humans to screen the criteria; and a machine learning system, that uses differences between the autonomous rules and the results of the human screening to learn from the human screening more about which autonomous rules are properly written, which rules are suspect, and also to create new autonomous rules.

10 Claims, 1 Drawing Sheet

(56) References Cited

U.S. PATENT DOCUMENTS

| | | | |
|---|---|---|---|
| 2017/0230387 A1* | 8/2017 | Srinivasan | H04L 63/1425 |
| 2018/0063198 A1* | 3/2018 | Anders | G06N 20/00 |
| 2018/0213033 A1* | 7/2018 | Subbian | G06Q 10/10 |
| 2019/0357049 A1* | 11/2019 | Tali | H04W 12/64 |
| 2020/0364727 A1* | 11/2020 | Scott-Green | G06Q 10/0635 |
| 2020/0401813 A1* | 12/2020 | Rabbat | G06V 30/248 |
| 2021/0049441 A1* | 2/2021 | Bronstein | G06N 3/08 |
| 2021/0357489 A1* | 11/2021 | Tali | G06F 16/2379 |
| 2021/0397653 A1* | 12/2021 | Russell | G06F 21/56 |

* cited by examiner

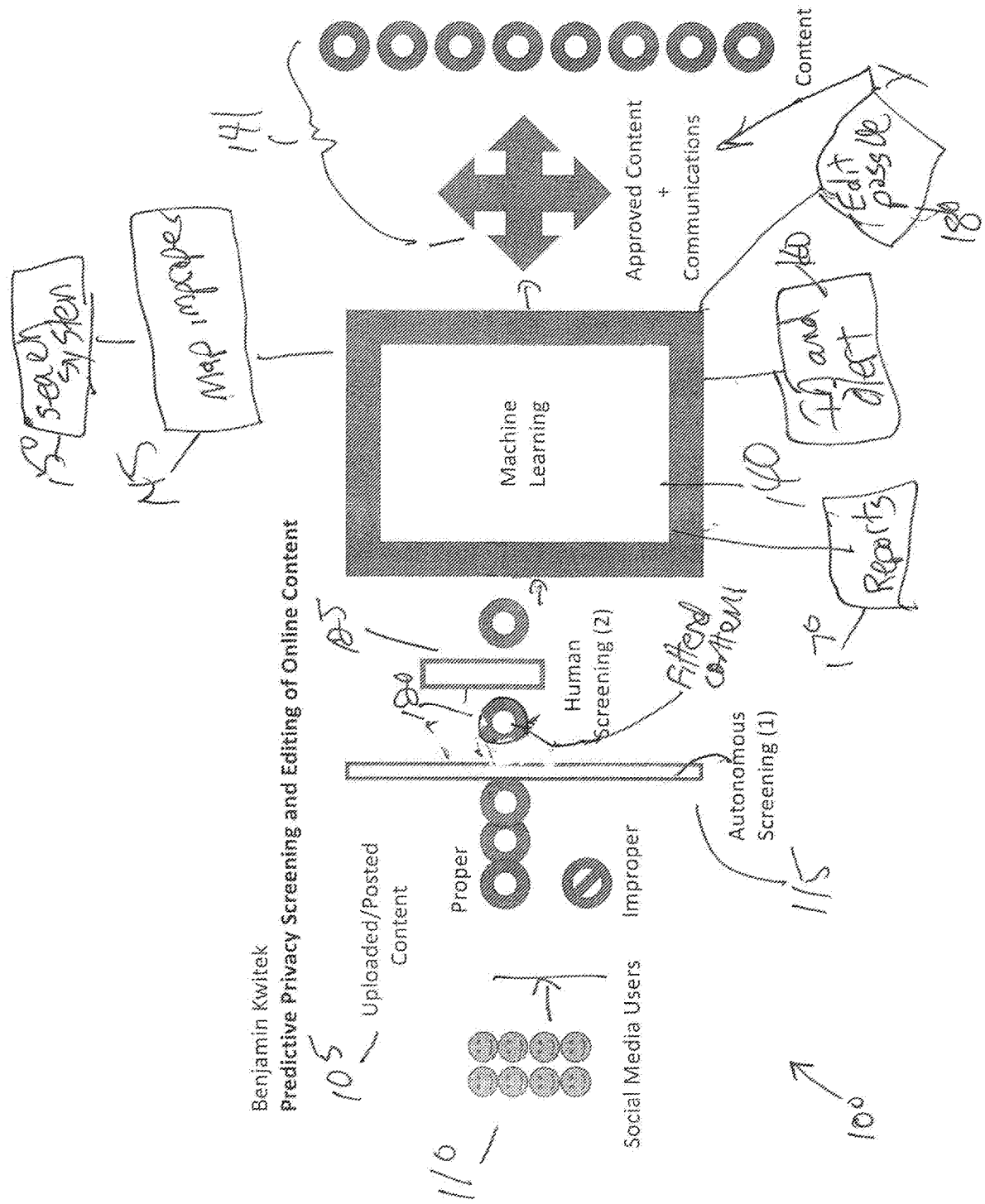

PREDICTIVE PRIVACY SCREENING AND EDITING OF ONLINE CONTENT

This application claims priority from Provisional Application No. 62/896,136, filed Sep. 5, 2019, the entire contents of which are herewith incorporated by reference.

BACKGROUND

There has always been a tradeoff between public attention and privacy. Popular figures and celebrities in modern culture have to balance this reality. On one hand, they need fans and awareness in the general population. On the other hand, they do not want every aspect of their lives to be public. Social media plays a unique role in this contemporary dilemma. Sites like Facebook, Instagram, Snapchat and Twitter allow celebrities to reach millions of people in real time. Unfortunately, these sites and services are also prone to hacking, irresponsible users, inaccurate content, fake news and sensationalism in general. The question is: how can the need for privacy be managed in the context of 24/7 communications around the world?

SUMMARY OF THE INVENTION

The present invention utilizes advanced software, computing power and proprietary methods to increase the security of persons and to find improper images and content on a social network or other online site.

BRIEF DESCRIPTION OF THE DRAWINGS

In the Drawings:
FIG. 1 shows a functional Block Diagram of the invention.

DETAILED DESCRIPTION

An embodiment is described with reference to the following example: assume that a person takes an inappropriate photo on their smartphone. This person then immediately uploads this image to their social media account. Often, this image is immediately saved and posted and/or liked by countless other people. This makes the policing efforts of social media companies challenging at best.

To be more specific, what if the posted photo was a partially naked celebrity. This image would quickly go viral given the public's appetite for these outrageous materials. A company such as Facebook might block the image or stop a user from posting it. The problem is that the original image might now be in the hands of millions of people who are sharing it on Facebook and other platforms. The image becomes part of the Internet and its eternal history before the celebrity would even know about the incident.

The described scenario of improper images or content being displayed or propagated on social networks is a significant problem. It creates significant liability issues for companies like Facebook. Perhaps more importantly, it also damages their trust and credibility in the market and with government officials. This may lead to increased scrutiny, fines, regulations or a potential embargo for the company. These risks are massive.

To combat this, many Internet companies have employed workers to screen and monitor the content being posted. The problem is the amount of material uploaded every second. It is too much to be screened by humans. So, what does a company like Facebook do to keep its users happy and free while at the same time protecting people from improper or negative images, stories and content?

The proposed invention utilizes computers and software to help mitigate this risk and protect privacy for social media users. The software relies on a combination of human judgements and machine learning. To paraphrase the famous Supreme Court decision on pornography, the present application teaches a system that knows improper content when it sees it. The proposed system operates using at least some of the following steps.

A computer 100, e.g. either server or client computer, first receives user content being posted online 105, from many different social media users 110. This run through an autonomous screening filter 115, which includes software to scan posted materials for improper elements (nudity, curse words, hate speech, fake news and others). The filter 115 can be updated from time to time, to learn different categories at different times.

At 120, the filtered content 125 is double-checked using trained human operators. This may be a spot check, or only a check of certain content which has been flagged by the autonomous screening to be questionable, or both.

The double check can be looking for visual identification of acceptable and unacceptable elements contained within a photo, image or paragraph.

The results are passed through a Machine learning process 140. The machine learning process 140 learns from the results of the Autonomous rules, and the results of the human screening, to learn from the human screening more about which autonomous rules are properly written, which autonomous rules are suspect, and also to create new autonomous rules for scanning the new content. Some of the rules can also be semiautonomous, meaning that they scan the content, but also mark the content as being one which is likely to need additional human screening.

The approved content is output as 141.

The system uses all of this to identify improper content. Once confirmed, the software maps the improper image or set of words at 145 and searches it out on the entire system at 150. The search uses advanced search techniques that would include relationship mapping, algorithms and computer vision. Any copycat posting of the marked content is blocked or deleted. The map would also screen new postings to prevent the spread of improper material.

This can also be used for identification and alert of stakeholders at 160. The software (with human support) is able to list users or people potentially impacted by the postings or attempted postings. This then allows for these people to be contacted. For example: if a naked photo of Jennifer Lawrence were posted, the software alerts her or her people. This would facilitate them "getting ahead of the story" to prevent damage to the reputation of the celebrity or involved person.

This system is also used for automatic data collection and reporting at 170. The system records the number of incidents on an hourly, daily, monthly or yearly basis. This information would potentially highlight trends such as foreign influence, illegal activities or trending events. This information is managed to promote user satisfaction and government compliance.

As described, the identification of content provides a neighborhood watch element. This means that everyday users of social networks could be "employed" to help monitor content in addition to the staff of the social networking and media companies. This crowdsourced effort would help the software have more instances to improve its recognition and censoring/policing efforts. The software would empower users to find and report improper uses in the network. These reports could be filtered by machine learning and screens that would limit the number of false alarms. The reporters might be monitored as well so they can be offered rewards or punished for false reports.

Automatic edits and censoring can be carried out at 180. In an effort to limit blocked content, the system might make minor edits to allow the material to exist. This might include words that are blacked out or bleeped or images that are cropped or edited to prevent personal recognition or damage.

The system can coordinate with governments and other organizations. The system can be flexible enough to accommodate laws and regulations in various markets. The settings can be set to be more specific in Europe versus the United States for example. This might also allow for currently offline markets such as China or Cuba to participate in the network but have distinct privacy controls.

The system can be continuously improved. The system would be updated and improved with each use. The software would recognize patterns and ultimately have predictive behavior elements. For example, a user might be contacted or blocked before he or she even has the opportunity to post something harmful. It could "Red Flag" people, places or players to ensure compliance.

Those skilled in the art will appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine.

The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard-wired network cable such as Ethernet or may be a wireless connection such as a RF link running under a wireless protocol such as 802.11. Likewise, external bus 18 may be any of but not limited to hard wired external busses such as IEEE-1394 or USB.

The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations, using tangible computer programming. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer-based instructions. An exemplary storage medium is coupled to the processor such that the processor can read information from, and write information to, the storage medium. In the alternative, the storage medium may be integral to the processor. The processor and the storage medium may reside in reconfigurable logic of any type.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A filtering system for received content, comprising:
   a computer, which receives content to be posted, the computer receiving content from a plurality of different users;
   the computer including a content filtering system, receiving the content from the plurality of different users, and operating to carry out a first autonomous screening of the content to use rules to determine whether the content meets a posting criteria, and categorizing the content as to whether the autonomous screening indicates that the content has met the posting criteria,
   the computer further receiving input from a human screening process which manually screens the criteria; and
   a machine learning system, that uses differences between the autonomous rules and the results of the human screening to learn from the human screening more about which autonomous rules are properly written, which rules are suspect, and also to create new autonomous rules,
   wherein the rules check for a posting showing an improper photo of a celebrity, creates a rule for the improper photo of the celebrity, and prevents others from reposting the same improper photo of the celebrity.

2. The system as in claim 1, wherein the human screening process is carried out only on certain content.

3. The system as in claim 1, wherein the content and the posting criteria includes nudity, improper words including hate speech, curse words, and fake news.

4. The system as in claim 1, wherein the content filtering system is semiautonomous and marks the content as one which is likely to need additional human screening.

5. The system as in claim 1, wherein the computer further, once categorizing content as improper, searches other posts to look for the same content.

6. The system as in claim 5, wherein the other posts are searched using relationship mapping, computer algorithms, and computer vision.

7. The system as in claim 1, wherein the content filtering system identifies specific people who are targeted by the posting, and sends an alert to those specific people indicating that they have been targeted by the posting.

8. The system as in claim 1, wherein the computer also creates a report.

9. The system as in claim 1, wherein the rules also mark content which is likely to need additional human screening from the human screening process.

10. The system as in claim 1, wherein the rules check for fake news, creates a rule for the fake news, and prevent others from posting the same fake news.

\* \* \* \* \*